(12) United States Patent
Shimomura et al.

(10) Patent No.: US 7,670,226 B2
(45) Date of Patent: Mar. 2, 2010

(54) METHOD FOR MANAGING GAME USING COMMUNICATION LINE

(75) Inventors: Satoshi Shimomura, Tokyo (JP); Yuko Tamada, Tokyo (JP)

(73) Assignee: Konami Corporation, Tokyo (JP)

( * ) Notice: Subject to any disclaimer, the term of this patent is extended or adjusted under 35 U.S.C. 154(b) by 368 days.

(21) Appl. No.: 10/565,856

(22) PCT Filed: Jun. 28, 2004

(86) PCT No.: PCT/JP2004/009113
§ 371 (c)(1),
(2), (4) Date: Jan. 25, 2006

(87) PCT Pub. No.: WO2005/077481
PCT Pub. Date: Aug. 25, 2005

(65) Prior Publication Data
US 2006/0205487 A1    Sep. 14, 2006

(30) Foreign Application Priority Data
Feb. 12, 2004    (JP) ............................. 2004-034696

(51) Int. Cl.
*G06F 17/00* (2006.01)
(52) U.S. Cl. .......................................... 463/42; 463/41
(58) Field of Classification Search .............. 463/41–42
See application file for complete search history.

(56) References Cited

U.S. PATENT DOCUMENTS

| 6,200,216 | B1 |   | 3/2001 | Peppel |  |
|---|---|---|---|---|---|
| 6,267,672 | B1 | * | 7/2001 | Vance | .......................... 463/29 |
| 6,497,410 | B1 | * | 12/2002 | Bernstein et al. | ............ 273/297 |
| 7,144,323 | B2 | * | 12/2006 | Yamaoka et al. | .............. 463/42 |
| 7,357,718 | B2 | * | 4/2008 | Yamaoka et al. | .............. 463/41 |
| 2002/0066783 | A1 | * | 6/2002 | Sawin | ......................... 235/379 |
| 2002/0068632 | A1 | * | 6/2002 | Dunlap | ........................ 463/42 |

(Continued)

FOREIGN PATENT DOCUMENTS

JP    6327835 A    11/1994

(Continued)

OTHER PUBLICATIONS

EU Search EP04746582, Jul. 23, 2007, Ayecon Ente., pp. 5,7,10,13.

(Continued)

*Primary Examiner*—Peter DungBa Vo
*Assistant Examiner*—Masud Ahmed
(74) *Attorney, Agent, or Firm*—Duane Morris LLP

(57) ABSTRACT

A game is divided into a plurality of charged playing sections which a player can play by paying a point and the thus divided charged playing sections are set. Game cards to which proper passwords are respectively assigned are distributed. The password is transmitted from a game playing terminal to a server, and the point corresponding to the password is set by the server. At this time, data comprising an image of a present item usable in the game is downloaded into the game playing terminal. In the game playing terminal, the image of the present item is produced and is displayed, and the server controls for allowing the player to play the charged playing section within bounds of the point which has been set on the account.

5 Claims, 5 Drawing Sheets

U.S. PATENT DOCUMENTS

2002/0198053 A1* 12/2002 Yamaoka et al. ............. 463/42

FOREIGN PATENT DOCUMENTS

| JP | 2002-153668 A | 5/2002 |
| JP | 2003-159481 A | 6/2003 |
| JP | 2003-210826 A | 7/2003 |
| JP | 2003-284871 A | 10/2003 |
| WO | WO 00/23910 | 4/2000 |

OTHER PUBLICATIONS

Electronic Arts: "Ultima Online" (Sep. 30, 1997), Electronic Arts, XP002443654; Retrieved from Internet on Jul. 18, 2007).
GAMEFAQS: "Ultima Online Release Date" (Jul. 18, 2007), GAMEFAQS, XP002443655; Retrieved from Internet on Jul. 18, 2007).

* cited by examiner

FIG. 4
(a)
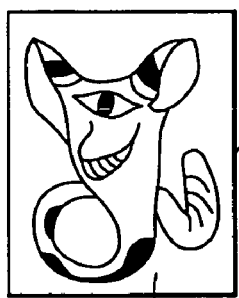
CPD
PIC
(b)
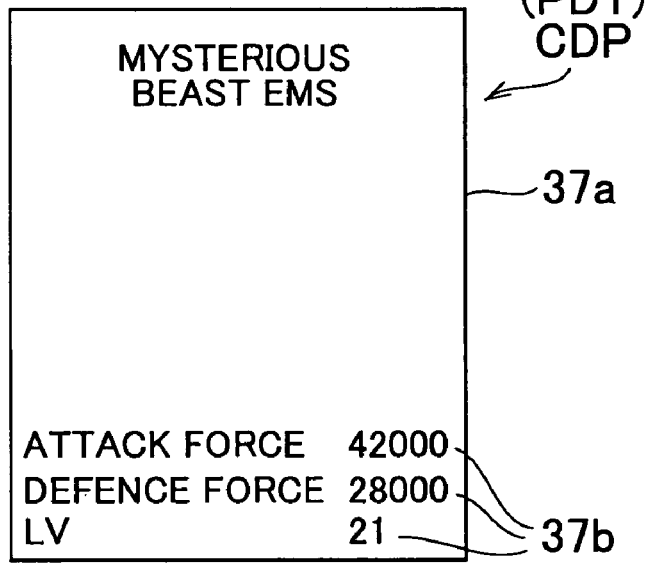
(PDT) CDP
(c)
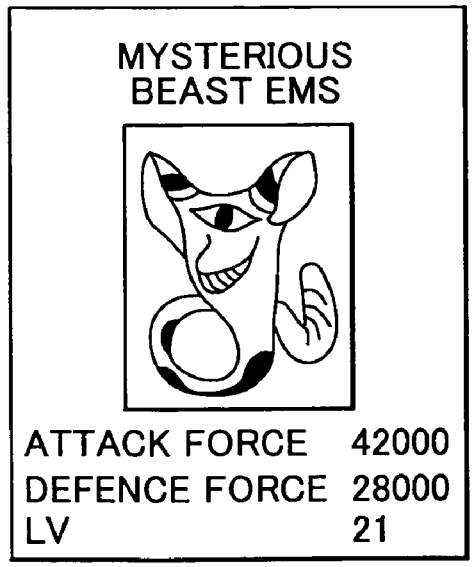
PI
PCD (CDP)

FIG. 5
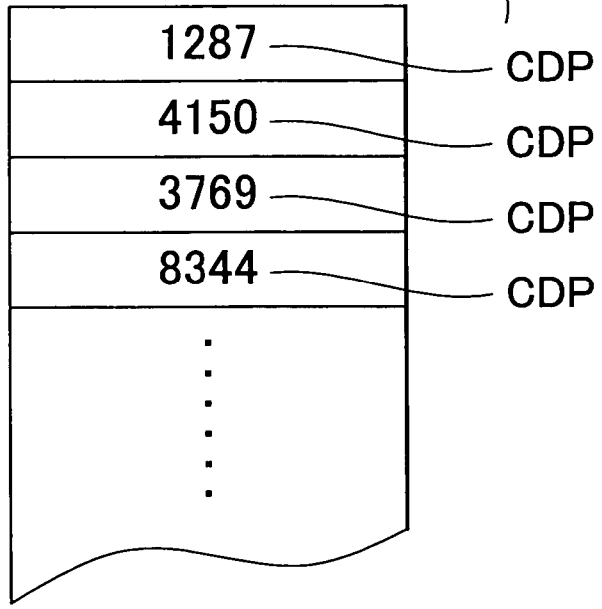
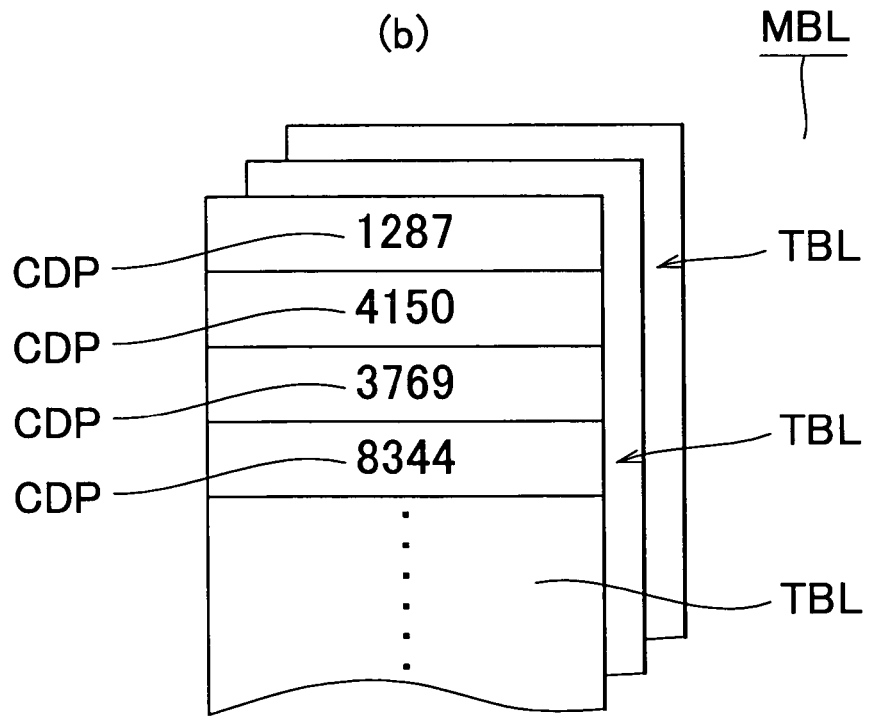

METHOD FOR MANAGING GAME USING COMMUNICATION LINE

TECHNICAL FIELD

The invention relates to a method of controlling a game with a communication line, for controlling games played through game playing terminals, such as portable phones, personal computers, and game machines for home use, by a server through a communication line, such as the Internet or a telephone line.

BACKGROUND ART

Such a game playing form is known that money is paid by a credit card and a game playing terminal is connected with a server through a communication line so as to enjoy a game within a predetermined time meeting paid money.

Applicant is not aware of documents to be disclosed as prior art where such a game playing form is systematically described.

When using charged system with credit cards, people who can not possess credit cards, such as children and persons under age, do not become players of games, which may lead to weakening of the whole game market since many people can not enjoy games.

In order to smoothly operate the charged system, registering operation to the server is inevitable for a player, but such a registering operation is generally troublesome for a player. Then, a method of controlling a game for giving a player a motivation for being willing to register is desired to be developed.

When controlling the game to be executed in such a game playing terminal by the server through the communication line, such as the Internet and a telephone line, measures for preventing some gamemanias from taking an unfairly action, such as altering card data should be taken.

Then, the method of controlling a game for being willing to register to the server for a player without using credit cards is desired to be developed.

Besides, the method of controlling a game where altering of card data is difficult is desired to be developed.

DISCLOSURE OF INVENTION

One aspect of the invention is a method of controlling a game with a communication line, comprising:

dividing said game into a plurality of charged playing sections which a player can play by paying a point (PT) and setting said sections;

distributing a plurality of game cards (33) for said predetermined game, to which proper passwords (35) are respectively assigned;

transmitting said proper password of said distributed game card from a game playing terminal to a server (10) through said communication line (2);

setting said point (PT) which shows game playable volume corresponding to said password on an account by said server;

downloading data (CDP) corresponding to an image (PI) of a present item (37) which is usable in said game from said server into said game playing terminal (9), from which said password has been transmitted, through said communication line when setting said point on said account;

producing said image of said present item according to said data corresponding to said image of said present item, and displaying said image on a display (31) in said game playing terminal into which said data have been downloaded; and controlling said game playing terminal by said server so as to allow said player to play said charged playing section within bounds of said point which has been set on said account of said server.

With such a structure, the game can be played without a credit card with the game card (33) assigning the proper password (35) thereto. And, the data (CDP) corresponding to the image (PI) of the present item (37) usable in the game is downloaded from the server through the communication line when opening the account, so that the present item gives the player a motivation of register action of the game card. Then, the player is willing to register to the server.

The other aspect of the invention is the method of controlling the game with the communication line, wherein a part of data comprising said image itself of said present item is prepared in said game playing terminal, and said data which has been downloaded into said game playing terminal from said server, corresponding to said image of said present item are data comprising said image itself of said present item, and said image of said present item is produced by said game playing terminal on the basis of both data, data comprising said image itself of said present item which has been downloaded from said server into said game playing terminal and a part of said data comprising said image itself of said present item which has been prepared in said game playing terminal.

According to this aspect of the invention, the image of the present item is produced on the basis of both data, the data which has been downloaded from the server and the data prepared in the game playing terminal, so that it is possible to prevent the player from unfairly obtaining the image PI of the play card 37 from the game program which is executed in the game playing terminal. Then, it becomes difficult to alter the card data, thereby improving the security of the system.

Besides, another aspect of the invention is the method of controlling the game with the communication line, wherein said data corresponding to said image of said present item is to be downloaded from said server into said game playing terminal only once when setting said point on said account for said game card.

According to this aspect of the invention, the data corresponding to the image of the present item is downloaded into the game playing terminal only once when setting the point on the account for the game card, so that the player's intention to buy the game card 33 can be improved, and besides, the player's intention to register the game card to the server can be also improved.

Another aspect of the invention is a method of controlling the game with the communication line for dividing said game into a plurality of charged playing sections which a player can play by paying a point and setting said sections, and for distributing a plurality of game cards for said predetermined game, to which proper passwords are respectively assigned, and for transmitting said proper password of said distributed game card from a game playing terminal to a server through said communication line, and for setting said point which shows game playable volume corresponding to said password on an account by said server, and for controlling said game playing terminal by said server so as to allow said player to play said charged playing section within bounds of said point which has been set on said account of said server, said method comprising:

storing predetermined items (37) which said player uses in said game, as control items in a control item table (TBL) in a memory in said server for each said player so as to prepare a master control item table (MBL);

detecting changed contents of said control item which is used in said game, if said contents of said control item is changed in a proceeding of said game with said each game playing terminal (9), and outputting said detected data to said server through said communication line (2) as control item changed data;

renewing by said server said control item table for said player in said master control item table, for which said control item changed data has been outputted on the basis of said inputted control item changed data, reflecting said changed contents of said control item thereon;

loading by said server said contents of said control item table of each player which is stored in said master control item table into said game playing terminal with which said player plays said game at predetermined time intervals so as to renew said control item table for said player which is stored in said game playing terminal; and controlling by said each game playing terminal to display said control item on a display (31) of said game playing terminal on the basis of said data of said control item which is stored in said control item table.

According to this aspect of the invention, all the control items in the game playing terminal (9) which the player uses in the game are renewed and controlled for each player by the server (10), and a copy of the control item table (TBL) which is controlled by the server (10) is stored in each game playing terminal (9). And, the control item table of each game playing terminal is renewed by the server (10) at constant time intervals, reflecting the contents of the master control table (MBL) of the server (10) thereon. Even if a player having an wrongful intent tries to rewrite the control item table in the game playing terminal so as to unfairly obtain the control item, therefore, the rewritten control table is renewed by the server (10) within a predetermined time, thereby preventing altering of the card data and forming the system which is strong in cheat and hacking.

Another aspect of the invention is the method of controlling the game with the communication line, wherein said each game playing terminal is controlled so as to prohibit said player from rewriting said control item table which is stored in said game playing terminal.

According to this aspect of the invention, the player is prohibited from rewriting the control item table of each game playing terminal (9), so that the control item table is not inadvertently changed, thereby improving security.

The number in parentheses shows the corresponding element in the drawings for the sake of convenience, accordingly, the present descriptions are not restricted and bound by the descriptions on the drawings.

BRIEF DESCRIPTION OF THE DRAWINGS

FIG. 4 is a view showing a rare card as a present item from the server to a player; and FIG. 5 is a view showing an instance of a player card control table, wherein (a) is a table which is stored in the game playing terminal, and (b) is a table which is stored in the server.

EXPLANATION OF REFERENCE NUMBERS

2 ... communication line
10 ... server
31 ... display
33 ... game card
35 ... password
37 ... present item (play card)
PI ... image
PT ... point
CDP ... data

BEST MODE FOR CARRYING OUT THE INVENTION

An embodiment of the invention will now be explained, referring to drawings.

Figure 1:
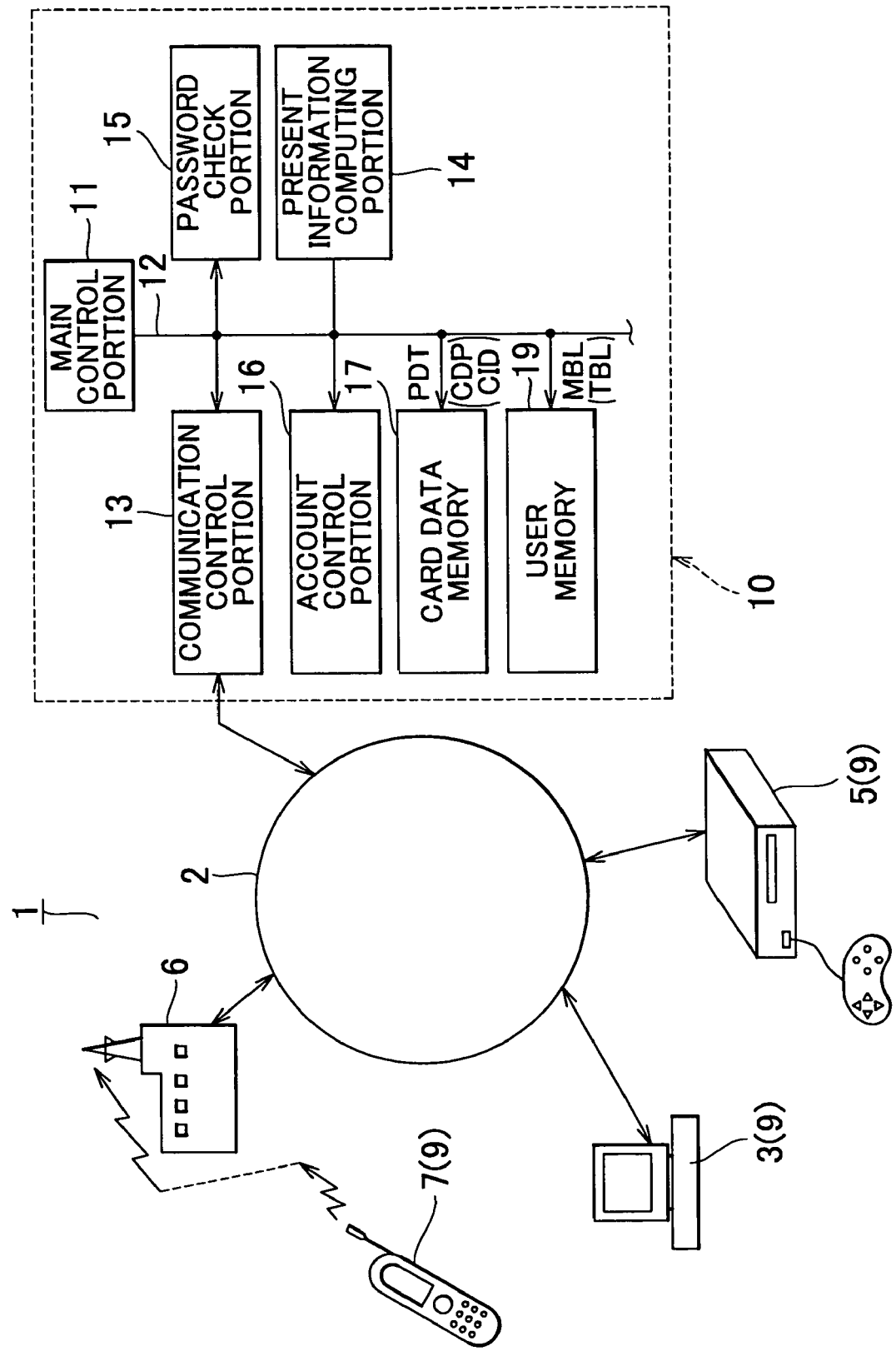
FIG. 1 is a typical view showing a network to which an instance of a method of controlling a game according to the present invention is applied.

As shown in FIG. 1, a network 1 has a communication line 2, such as the Internet and a telephone line, and many personal computers 3 and game machines 5 are connected with the communication line 2. And, many portable phones 7 are connected with the communication line 2 through a base station for portable phones 6. In this specification, machines for playing a game therethrough, such as personal computers 3, game machines 5, and the portable phones 7, are collectively called game playing terminals 9.

A server 10 is connected with the communication line 2, and the server 10 has a main control portion 11, and a communication, control portion 13, a password check portion 15, an account control portion 16, a present information computing portion 14, a card data memory 17, and a user memory 19 which are connected with the main control portion 11 through a bus line 12.

Figure 2:
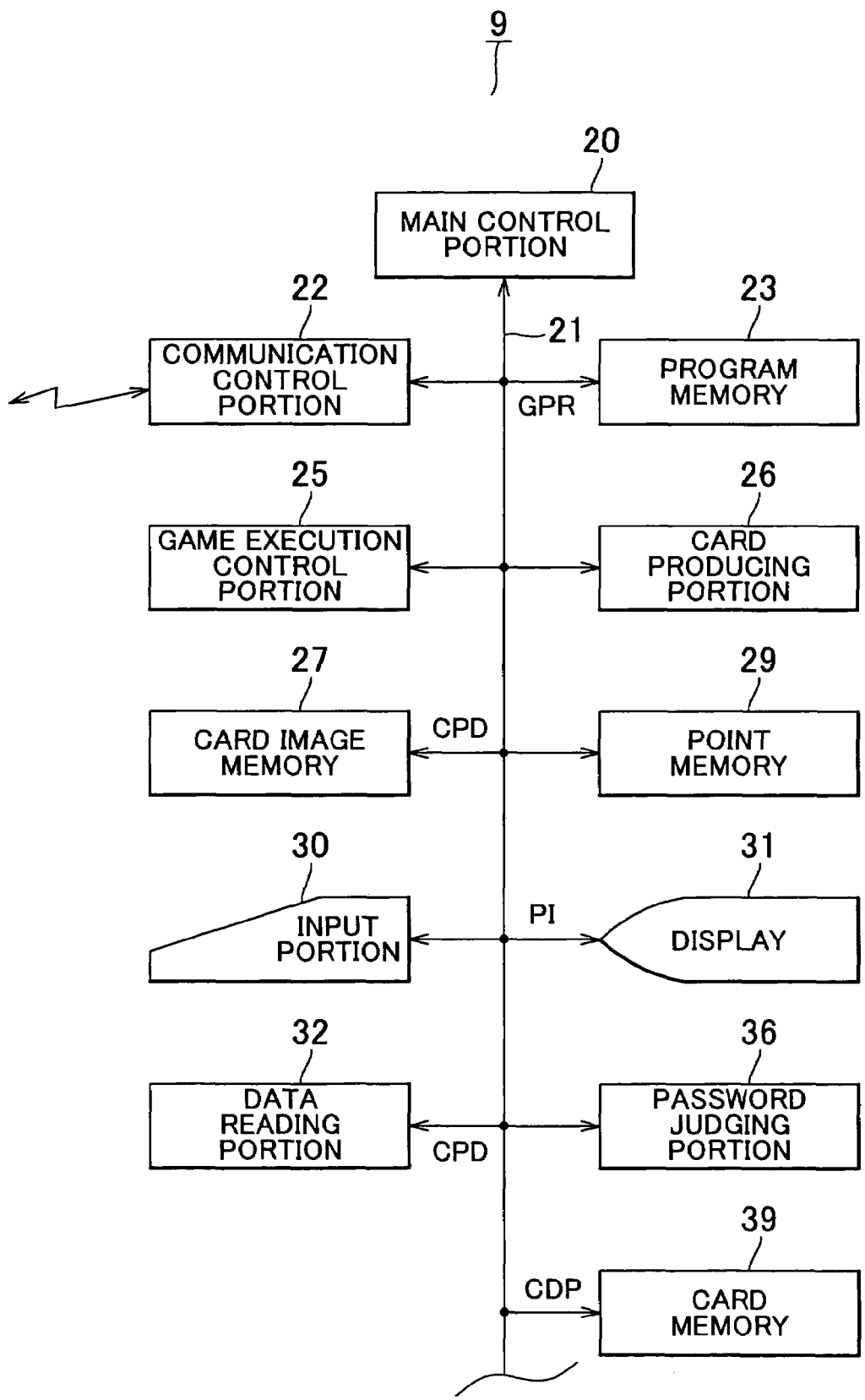
FIG. 2 is a view showing an instance of a game playing terminal.

As shown in FIG. 2, each game playing terminal 9 has a main control portion 20, and a communication control portion 22, a program memory 23, a game execution control portion 25, a card producing portion 26, a card image memory 27, a point memory 29, an input portion 30, a display 31, a data reading portion 32, a password judging portion 36 and a card memory 39 are connected with the main control portion 20 through a bus line 21.

In the respective blocks of the server 10 and the game playing terminal 9, functions to be exerted by a computer according to software are typically shown, and thus, actual hardware of each machine is not shown therein. And, the game playing terminal 9 has hardware and software which are suited for each proper machine, such as the personal computer 3, the game machine 5, the portable phone 7, and functions proper for each machine are exerted in combination of both. The specification lacks explanations of the functions proper for the respective machines since the personal computers 3, the game machines 5 and the portable phones 7 are dealt with only game playing terminal 9, as mentioned before.

Figure 3:
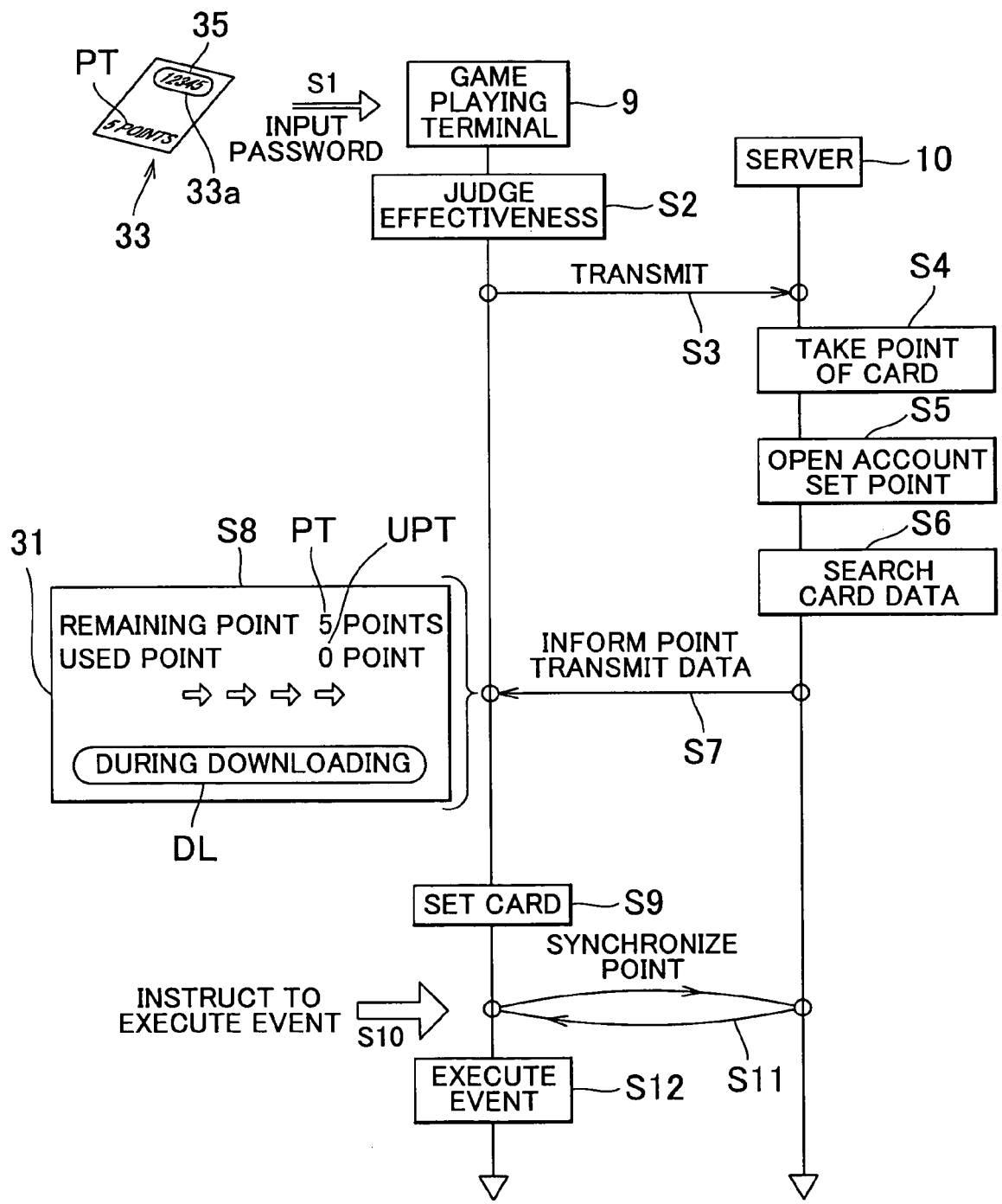
FIG. 3 is a time chart showing a communication between the game playing terminal and a server.

The network 1 has the above-mentioned structure. when a player starts to play a game, the player buys a game card 33 at a shop in a town by paying predetermined money. The game cards 33 broadly appear on the market by a game controller as items necessary for playing a specific game through the game playing terminal 9, and circumstances where players can freely get the game cards 33 by paying predetermined money has already been prepared. The game card 33 includes a password 35 proper for the game card 33, as shown in FIG. 3 (that is, each game card 33 on the market corresponds to the password 35 with the ratio 1:1), and the player can not recognize the password 35 when buying the game card 33 since a mask 33a is attached onto the surface thereof. On the game card 33, a unit of game to be played with the game card 33 is shown as a point PT (volume of a game to be playable). In case of the game card 33 as shown in FIG. 3, the point PT is a constant value, for example five points.

After buying the game card 33, the player exposes the password 35 by scratching the mask 33a or by the other method, and gets the program memory 23 of the game playing terminal 9 to read game program which is stored in a storage medium, such as a ROM disc through the data reading portion 32 so as to start the game program. As shown in FIG. 2, the game playing terminal 9 invites the player to input the password 35 through the display 31 according to game program GPR which is stored in the program memory 23.

Receiving this invitation, the player inputs the password 35 shown on the game card 33 through the input portion 30 as shown in step S1 of FIG. 3. The main control portion 20 of the game playing terminal 9 gets the password judging portion 36 which comes to have functions by a task produced according to the game program GPR to judge effectiveness of the inputted password 35 (step S2 of FIG. 2). If the password 35 is judged to be effective, the communication control portion 22 is connected with the server 10 though the communication line 2. This communication with the server 10 through the communication control portion 22 is also controlled according to the game program GPR.

The effectiveness of the password 35 may not be judged by each game playing terminal 9, but may be judged by the server 10 after transmitting the inputted password 35 to the server 10 as it is through the communication line 2.

The main control portion 20 of the game playing terminal 9 transmits the password 35 shown on the game card 33, which was judged to be effective by the password judging portion 36, to the server 10 through the communication line 2, as shown in FIG. 1, and the main control portion 11 of the server 10 outputs the password 35 from the game playing terminal 9 which was inputted in the communication control portion 13 to the password check portion 15, and reads card data DATA corresponding to the password 35 out of the card data memory 17.

The card data memory 17 stores data of the game cards 33 which are commercially available, together with the passwords 35 of the respective game cards 33 and game playable volume set on the respective game cards 33, that is, the points PT. The main control portion 11 of the server 10 searches the card data memory 17 with the password which was sent from the game playing terminal 9 so as to specify the game card 33 corresponding to the password 35, and takes the point PT which is set on the game card 33 as the game playable volume (Step S4 of FIG. 3).

In this case, the password check portion 15 takes five points as the game playable volume, corresponding to the password 35 which has been sent from the game playing terminal 9. Subsequently, the main control portion 11 of the server 10 instructs the account control portion 16 to open an account corresponding to the password 35. Receiving this instruction, the account control portion 16 opens the account corresponding to the password 35 in the user memory 19, and sets an initial value of the point PT, five points on the account, the point being the game playable volume for the password 35 (Step 5S of FIG. 3). The account corresponding to each password may be opened in advance. Alternatively, an individual account proper to a user may be opened in advance, and then, the points and present items may be controlled according to the passwords 35, taking use of the individual accounts.

After setting the account which corresponds to the password 35, the main control portion 11 of the server 10 instructs the present information computing portion 14 to download a play card which can be used during the game to be executed by the game program as a present item into the game playing terminal 9 which corresponds to the password 35 having the account newly opened by the account control portion 16.

Receiving this instruction, the present information computing portion 14 retrieves the card data memory 17, and computes to randomly select one play card to be downloaded into the game playing terminal 9 (Step S6 of FIG. 3).

The card data memory 17 stores various data of the play cards 37 which can be used during the game to be executed by the game playing terminal 9 as data of the present items PDT together with their identification data ID. The present information computing portion 14 computes to randomly select one play card to be downloaded into the game playing terminal 9 out of the data of the play cards which are stored in the card data memory 17.

The play cards 37 are generally a plurality of cards having a pre-set predetermined probability of appearing, which are selected by the game execution control portion 25 of FIG. 2 from many play cards 37 being stored in a predetermined data area of the game program when the player plays the game with the game playing terminal 9, and the selected play cards 37 are set as hands for the player. But, the play cards 37 which are downloaded from the server 10 are so-called rare cards the probability of appearing of which is set to be lower in the game playing terminal 9. The player will be willing to buy the game cards if the rare card which can be seldom obtained in a usual playing is to be thus downloaded as a present from the server 10 when the player registers the game card 33.

The present items to be downloaded into the game playing terminal 9 from the server 10 may be many items, such as characters who can act in the game, BGM (background music) which can be used in the game, and items which can be used in the game, as well as the play cards 37 which can be used in the game. In the above-mentioned case, the present information computing portion 14 searches the card data memory 17 and randomly selects one play card to be downloaded into the game playing terminal 9. Alternatively, the password 35 which has been transferred from the game playing terminal 9 may have information corresponding to the specific play cards in advance, and the present information computing portion 14 may select the specific play card by detecting the identification information of the specific play card by the password check portion 15 with the password 35.

The data PDT of the present item (the play card 37) which is extracted from the card data memory 17 by the present information computing portion 14 and is downloaded into the game playing terminal 9 where the password 35 is registered are not all data necessary for producing an image of the play card 37, but a part thereof. Then, the game playing terminal 9 can not produce the image of the play card only with the data PDT which is downloaded thereinto.

For instance, the data PDT of the present item which is read out from the card data memory 17 by the present information computing portion 14 are partial card data CDP for producing characters 37b and a border 37a of the play card 37 as shown in FIG. 4(b) and card identification data CID corresponding to the play card 37 only, of the data PCD for producing the play card 37 as shown in FIG. 4(c).

After thus reading the data PDT of the present item to be downloaded into the game playing terminal 9 out of the card data memory 17 by the present information computing portion 14, the main control portion 11 of the server 10 transmits (downloads) the data PDT of the present item and the point PT (five points in this case) which is the game playing volume for the registered game card 33 to the game playing terminal 9 where the player requests to register through the communication control portion 13 (Step S7 of FIG. 3).

By doing so, the data PDT of the present item and the point PT as the game playable volume which have been downloaded from the server 10 are inputted in the communication control portion 22 of the game playing terminal 9 on the player's side through the communication line 2. The main control portion 20 of the game playing terminal 9 immediately displays the point PT as the game playable volume on the display 31, and displays "During Downloading" DL which shows the data PDT of the present item is being loaded (Step S8 of FIG. 3). The player can recognize obtaining of the present item due to his own operation of registering the game card 33 in the server 10 when seeing this "During Downloading" DL. The display 31 displays a used point UPT, a point which the player has already used as well as the point PT as the game playable volume. When registering the game card 33 by the player, the used point UPT is zero.

After downloading the data PDT of the present item from the server 10, the main control portion 20 of the game playing terminal 9 of the player instructs the card producing portion 26 to produce an image PI of the play card 37 as the present item.

Receiving this instruction, with the card identification data CID of the data PDT of the present item, the card producing portion 26 reads card image data CPD corresponding to the card identification data CID out of a ROM disc storing game program, which is set on the data reading portion, or a card image memory 27 into which the card image data has already been loaded from the ROM disc. As already described, the game program stores the data PCD for producing the images PI of all the play cards 37 to be used in the game with game program so as to be freely read out, and besides, the game program also stores the data concerning the play cards 37 as the present items to be downloaded from the server 10 with the card identification data CID so as to be freely read out.

In other words, the game program stores illustration data CPD showing an illustration PIC portion as shown in FIG. 4(a) of the data PCD for producing the image of the play card 37 as the present item so as to correspond to the card identification data CID. The card producing portion 26 reads the illustration data CPD of the play card 37 which has been downloaded from the server 10, corresponding to the card identification data CID, and combines the thus read data with the partial card data CDP which comprises a part of the image PI of the play card 37 downloaded from the server 10 as the present item as shown in FIG. 4(c) so that the image PI of the play card 37 as the present item is produced (Step S9 of FIG. 4).

After thus producing the play card 37 as the present item, the player instructs execution of the game through the input portion 30. Receiving this instruction, the main control portion 20 instructs the game execution control portion 25 to start a predetermined game according to the game program which is stored in the program memory 23. Then, the player can use the play card 37 as the present item which was produced by the card producing portion 26 as his (her) own card in the game.

Any form of the data PDT of the present item which is downloaded from the server 10 is available as long as the data is a part of the data PCD for producing the image PI of the play card 37. That is, the present item can not be produced only either the data concerning the present item which is stored in the game program of the game playing terminal 9 or the data PDT of the present item which is downloaded from the server 10, but is produced by both data through a present item producing portion of the game playing terminal 9, such as the card producing portion 26. As long as such producing condition can be satisfied, the data concerning the present item which is stored in the game program of the game playing terminal 9 and the data PDT of the present item which is downloaded from the server 10 are optional.

In order to decrease the volume of the data PDT to be downloaded from the server 10 as much as possible and to rapidly download the present item, text data which can be rapidly transferred are mainly used as the data PDT to be downloaded from the server 10, preferably.

The data comprising the image PI itself of the play card 37 are formed from both data, the data which is downloaded from the server 10, and the data which is stored in the game program on the game playing terminal side without such a method that only register number or identification number for specifying the image PI of the present item is downloaded into the game playing terminal 9 from the server 10, and the data of the image PI of the present item corresponding to the register number or the identification number is read out of the game program which is stored on the game playing terminal side, so that some gamemanias having wrongful intensions can be prevented from unfairly obtaining the image PI of the play card 37 from the game program which has been studied by themselves, thereby improving a security of the system.

The player thus plays the game according to the scenario which is controlled by the game execution control portion 25 through operations of the input portion 30 of the game playing terminal 9 as a computer. In the game scenario, a plurality of events for consuming the point PT are set as charged playing sections. For instance, it is proper that such a game is a card battle game. In this case, the above-mentioned point PT is a point to be paid in a card battle, and the play cards 37 which have been downloaded are cards to be used in the card game battle. The games to which the present invention is applied are not limited to battle games with cards, but are various games, such as role-playing games, action games, adventure games and sports games.

If the game execution control portion 25 tries to execute the event through which the point PT is consumed, the player instructs the game execution control portion 25 whether or not the event through which the point is consumed should be executed through the input portion 30. When not executing the event, the proceeding of the scenario of the game stops at this point of time, and the player is controlled not to further proceed with the game by the game execution control portion 25.

When the player instructs to execute the event through the input portion 30 (Step S10 of FIG. 3), the main control portion 20 of the game execution terminal 9 accesses server 10 through the communication control portion 22 and the communication line 2, and transmits the password 35 of the game card 33 which has been registered in the server 10 and informs the server 10 of consuming the point PT which has been set on the game card 33 so as to execute the event.

Receiving this information, the main control portion 11 of the server 10 gets the account control portion 16 to find the account corresponding to the password 35 which has been transmitted from the game execution terminal 9 out of the user memory 19, and subtracts one point from the point PT which is stored in the found account so as to renew the point from "5" into "4", and informs the game execution terminal 9 corresponding to the password 35 of the remaining points after this subtraction through the communication control portion 13 and the communication line 2 (Step S11 of FIG. 3). Receiving this information, the game execution terminal 9 subtracts one point from the point PT, "5" which is stored in the point memory 29 so as to become "4", and displays used point UPT which has been consumed by the player through this event and remaining point PT which is the left point "4" as the game playable volume on the display 31.

After the game playing terminal 9 and the server 10 thus have the same remaining point PT as the game playable volume of the game card 33 owned by the player, the main control portion 20 of the game playing terminal 9 allows the game execution control portion 25 to execute the event, and the player plays the event which is executed by the game execution control portion 25 through an operation of the input portion 30 (Step S12 of FIG. 3). In this event, the game execution control portion 25 deals with the present item which has been obtained by the player from the server 10 as the usual item usable in the game, so that the player can enjoy the event and the game scenario including the event with the present item.

Even if the player interrupts the game at the game playing terminal 9 and thereafter, the player executes the game of the game card 33 in the different game playing terminal 9, the player can freely enjoy the game as long as he (or she) has the game program since the point PT as the game playable volume of the game card 33 owned by the player is stored in the user memory 19 of the server 10 as the remaining point of the point PT, and the player accesses the user memory 19 of the server 10 through the different game playing terminal 9 with a proper password 35 of the game card 33, and the account corresponding to the password 35 is read out of the user memory 19, and the different game playing terminal 9 which the player operates is informed the remaining point which is stored in the account, and the informed point is stored in the point memory 29.

Only the events set in the game are not always executed with the point PT as the game playable volume which is set on the game card 33, but the game may be played for a predetermined time with the point PT. In other words, the game to be executed by the player through the game program at the game playing terminal 9 is divided into a plurality of charged playing sections, depending on the events and the playing time (these charged playing sections are not always connected with each other). The charged playing sections can be respectively separately bought by paying the point PT.

When the present item is downloaded into the game playing terminal 9 from the server 10, a flag showing the present item has already been downloaded is stored in the account corresponding to the game card 33 of the user memory 19 of the server 10. Even if the player accesses again the server 10 through the game playing terminal 9 and the communication line 2 on the basis of the remaining point of the game card 33 in order to restart the game according to the game program, the present item is not downloaded to the password 35 or the game card 33 since the flag showing that the present item has already been downloaded is stored in the account corresponding to the password 35.

If the player has used all the points PT as the game playing volume which is set on the game card 33, the game playing terminal is informed that the remaining point in the account is "zero" by the server 10. If the remaining point "zero" is informed by the server 10, the game execution control portion 25 of the game playing terminal 9 informed the player that the event of the game can not be played due to the remaining point "zero" through representations on the display 31 when the scenario reaches the charged playing section, such as the event of the game. Then, the player is controlled to play the game through the game playing terminal 9 in the charged playing sections within the bounds of the points PT which is set on the game card 33 which has been registered in the server 10 by his (her) own.

If the player wishes to further continue playing the game, the player will buy a new game card 33 at a shop of a town, and access the server 10 through the game playing terminal 9 in a similar way, and continue the game by newly opening an account corresponding to the password 35 of the game card 33 in the user memory 19 of the server 10 (or by registering the point PT assigned to the game card 33 bought by the user the password 35 of which has been registered in the user's account which has been already opened in the user memory 19).

If the game program executed by the player through the game playing terminal 9 is a card game, the play cards 37 to be used in a game are set as an control item in the server 10 and each game playing terminal 9. And, the game execution control portion 25 of each game playing terminal 9 stores a predetermined number of play cards which the player uses at the present (for example, forty through fifty play cards 37 or so) as the card identification data CDP in the card memory 39 of the game playing terminal 9. This card identification data CDP is given to all the play cards 37 useable in the game program including the play card 37 as the present item with 1:1. If the card identification data CDP is known, the image PI of the corresponding play card 37 can be immediately produced through the card producing portion 26 and displayed on the display 31 by directly reading from the card image memory 27 or by reading the card image data CPD which is stored in the ROM disc for storing the game program through the data reading portion 32.

For example, the card memory 39 of each game playing terminal 9 stores a player card controlling table TBL for controlling the play cards as the control item, as shown in FIG. 5(a). The player card controlling table TBL stores the card identification data CDP of the predetermined number of play cards 37 which are used in the card game played by the player through the game playing terminal 9 at the present. The card identification data CDP are data to be used when displaying the play card 37 on the display 31, and are controlled by the game program and the main control portion 20 so as not to be rewritten in their contents through an operation of the game playing terminal 9 by the player.

The card identification data CDP of the player card controlling table TBL is renewed by the account control portion 16 of the server 10 at constant time intervals (for example, at intervals of several seconds through several tens of seconds) through the communication line 2 on the basis of the contents of the player card control table TBL which is stored for each player in the player card master control table MBL which has been registered in the user memory 19 of the server 10. In other words, the information of the control item of the game playing terminal 9 which is stored in each game playing terminal 9 is renewed by the server 10 at constant time intervals (for example, at intervals of several seconds through several tens of seconds). Then, the player card controlling table TBL of the game playing terminal 9 of each player is a copy of the player card controlling table TBL for the player which is stored in the user memory 19 of the server 10.

That is, the player card master controlling table MBL which is stored in the user memory 19 of the server 10 respectively stores the card identification data CDP of the play cards 37 which are used by the player in the game every player for all players whose accounts have been opened in the user memory 19 by the account control portion 16 as the player card controlling table TBL for each player, as shown in FIG. 5(b). In other words, the server 10 collectly controls the information of the control items for all players, and the controlled information is loaded into (is renewed) the game playing terminal 9 operated by each player at predetermined time intervals.

If after start of the game through the operation of the game playing terminal 9 by the player, hands of the player necessary for proceeding of the game according to the game program are set or selected in a state of having no hand, or hands, piled cards or thrown cards are changed due to a battle with an opponent player with the proceeding of the game, in other words, if the contents of the play cards which the player uses in the game (such as kinds and number of the play cards 37 as control item) are changed, the main control portion 20 and the game execution control portion 25 of the game playing terminal 9 detects the change of the play cards 37, and immediately sends the data contents to the changed play cards 37 to the server 10 through the communication line 2 as control item changed data.

When a notification of change of the player cards 37 being inputted from each game playing-terminal 9 into the server 10 as the control item changed data, the contents of the player card control table TBL which is stored in the user memory 19, corresponding to the player who operates the game playing terminal 9 through which the control item changed data has been outputted are renewed according to the inputted control item changed data in response to the notification of change. Then, each player card control table TBL of the player card master control table MBL of the server 10 is renewed so as to correspond the contents of the play cards which each player uses in the game with the game playing terminal 9 and the card identification data CDP with each other. And, the server 10 can immediately compute and judge "with which play cards 37 the player is presently playing the game" for all players connecting therewith through the communication line 2, that is, all players whose accounts have been set in the account control portion 16 of the server 10 by referring to each player card control table TBL of the user memory 19. If the player played the game, and thereafter, disconnected with the server 10 so as to interrupt proceeding of the game, the contents of the play cards which have been used at the game playing terminal 9 at this interruption time can be also immediately computed and judged.

The change of the contents of the player cards 37 in the proceeding of the game which the player plays with the game playing terminal 9 can be reflected on the player card control table TBL of the game playing terminal 9 without a substantial time delay since the account control portion 16 of the server 10 renews the contents of the player card control table TBL to be used for representations which is stored in the card memory 39 on the basis of each player card control table TBL of the player card master control table MBL of the server 10 at predetermined intervals (several seconds through several tens of seconds is preferable) for all game playing terminals 9 which are connected through the communication line 2.

Even if the player operates the game playing terminal 9 on the basis of the image PI of the player card 37 which is displayed on the display 31 according to the card identification data CDP of the play card 37, which is stored in the player card control table TBL of each game playing terminal 9, and at the result of the operation, the player obtains or loses some player card 37, or sets hands or adds the card to the hands from piled cards, such change is correctly reflected on the player card control table TBL of each game playing terminal 9 through each player card control table TBL of the card master control table MBL of the server 10, thereby securing smooth game proceeding.

As already mentioned, the player card control table TBL of each game playing terminal 9 is provided for representations on the display 31, and is a copy of the player card control table TBL for each player which is stored in the server 10. Even if the player interrupts proceeding of the game program or turns out the game playing terminal 9, so that the player card control table TBL which is stored in the card memory 39 is deleted, therefore, the contents of the play cards 37 which have been used in the time of point is stored in the server 10.

Even if the player puts on the game playing terminal 9 again so as to restart the game, or executes the game program again so as to restart the game, the server 10 immediately loads each player card control table TBL of the player card master control table MBL of the server 10 into the card memory 39 of the game playing terminal 9. In this case, loading of data is considered to also be renewal of the player card control table TBL in the vast meaning. Therefore, the player can immediately restart the game without complex operations by the player, such as saving of the card identification data CDP of the player card control table TBL and reloading of the data. Even if the player changes the hardware of the game playing terminal 9, for instance, even if the player restarts the game with a personal computer which is different from one in the game interruption time, the game can be immediately restarted. Due to these reasons, the player can immediately restart the game only by loading the game program without carrying the game playing terminal 9 as long as there is hardware usable as the game playing terminal 9, such as a portable phone and a personal computer at a place where the player intends to restart the game, thereby being rich in mobility.

And, the player card control table TBL which is stored in the card memory 39 of the game playing terminal 9 is a copy of each player card control table TBL of the player card master control table MBL of the server 10, and the contents of data are always rewritten and renewed by the server 10 so as to correspond with the contents of the player card control table TBL of the server 10 as long as the game playing terminal 9 connects with the server 10. Even if a player having an wrongful intent tries to rewrite the card identification card CDP of the player card 37 which is stored in the player card control table TBL of the game playing terminal 9 so as to unfairly obtain a rare card or the like from the card data which is stored in the game program, therefore, the player can not use the unfairly obtained play card 37 in the game since the contents of the player card control table TBL of the game playing terminal 9 are rewritten so as to correspond with the original contents of the player card control table TBL of the server 10 within a short time, thereby preventing such unfair action.

In the above-mentioned embodiment, the game which the player plays is a card game, and the server 10 controls all play cards 37 which the player actually uses with the game playing terminal 9 when playing the game (including all play cards 37, such as cards on a board, piled cards, thrown cards, hands, pertinent to game playing which are actually used in the game, but not including play cards which are not used in an actual game playing, the image PI of which is not produced as the play card 37 in the game playing terminal 9 although such cards are potentially stored in the game program), by preparing in the server 10 the player card control table TBL for each player. In other words, the above-mentioned embodiment refers to one where the server 10 controls the play cards 37 as the control item, but the control item controlled by the server 10 may be properly changed, depending on kinds of games provided by game program.

In other words, the games provided by the game program may be off course any kinds of games, including role-playing games, adventure games, action games, as well as card games. In this case, the control items to be used in the game by each player, which are controlled by the server 10 may be any ones, including characters appearing in the game, items to be used in the game, and deathblow skills. But, the control items are desired to be items having important roles on a development of a scenario of a game when considering an object of controlling the items to be used by players in the pay game, avoiding unfair actions by players.

INDUSTRIAL APPLICABILITY

The present invention can be utilized when connecting many game playing terminals with the server through a communication line so as to allow players to play games for pay.

The invention claimed is:

1. A method for controlling a game with a communication line in a system wherein a card game is played with two or more playing cards at each of a plurality of game playing terminals, and a server is connected with the plurality of game playing terminals through said communication line, the method comprising:
    storing said card game in memory on each of said plurality of game playing terminals, dividing said game into a plurality of charged playing sections which a player can play by paying a point and setting said sections;
    storing data in said memory of each of said plurality of game playing terminals, said data including a first portion of data representing a first portion of a complete image of a present item;
    selecting said two or more playing cards to be used in said game from playing cards stored in said memory of said game playing terminal and setting said selected cards as a hand to be used for said game in a predetermined data area of said game playing terminal at a time when playing a predetermined game at said game playing terminals;
    storing a second portion of data in memory means of said server, said second portion of data representing a second portion of the complete image of said present item;
    distributing a plurality of game cards for said predetermined game, to which proper passwords are respectively assigned;
    transmitting said proper password of said distributed game card from a game playing terminal to said server through said communication line by inputting said password through an input portion of said game playing terminal;
    setting said point which shows game playable volume corresponding to said password on an account which is set in said memory means of said server, by said server;
    selecting said present item to be downloaded to said game playing terminal from a plurality of present items stored in said memory means of said server;
    downloading said second portion of data from said server into said game playing terminal through said communication line;
    reading said first portion of data from said memory means of said game playing terminal, producing said complete image of said present item from said first and second portions of data, and displaying said complete image of said present item on said display;
    wherein it is impossible to produce said complete image of said present item from only said first portion of data or said second portion of data;
    controlling said game playing terminal by said server so as to allow said player to play said charged playing section within bounds of said point which has been set on said account of said server.

2. The method of controlling the game with the communication line according to claim 1, wherein said data corresponding to said image of said present item is to be downloaded from said server into said game playing terminal only once when setting said point in said account for said game card.

3. A method for controlling a game with a communication line for storing a game program which is divided into a plurality of charged playing sections which a player can play by paying a point, and for distributing a plurality of game cards for said predetermined game, to which proper passwords are respectively assigned, and for transmitting said proper password of said distributed game card from a game playing terminal to a server through said communication line, and for setting said point which shows game playable volume corresponding to said password, in an account in memory means of said server for each player by said server, and for controlling said game playing terminal by said server through said communication line so as to allow said player to play said charged playing section within bounds of said point, said method comprising:
    controlling said game playing terminal to store predetermined items, which said player uses in said game, as control items in a control item table for display provided in said memory means of said game playing terminal;
    reading said control item to be displayed out of said control item table for display and to display said read control item at said game playing terminal;
    storing said control items, which each player uses in a game presently played in said game playing terminal for said player, in a master control item table which is stored in said memory means of said server by an account control portion of said server; and
    loading by said account control portion of said server said contents of said master control item table of each player which is stored in said master control item table into said game playing terminal with which said player plays said game two or more times at predetermined time intervals while connecting said game playing terminal and said server with each other through said communication line so as to renew said control item table for display in said game playing terminal by said game execution control portion of said game playing terminal, thus the control item table for each terminal is renewed at periodic time intervals reflecting a change in said master control item table due to a proceeding said, game which said player plays without, generating time delay.

4. The method of controlling the game with the communication line according to claim 3, wherein said each game playing terminal is controlled so as to prohibit said player from rewriting said control item table which is stored in said game playing terminal.

5. The method of controlling the game with the communication line according to claim 3, further comprising:
    detecting changed contents of at least one of said control items which is used in said game, if said contents of said control item is changed in a proceeding of said game with said game playing terminal, and outputting said detected data to said server through said communication line as control item changed data by a main control portion and a game execution control portion of said game playing terminal; and
    renewing, by said account control portion of said server, said control item table for said player in said master control item table, for which said control item changed data has been outputted on the basis of said inputted control item changed data, and reflecting said changed contents of said control item thereon;
    wherein when interrupting said game, said player need not save said control item table, and said game is restarted by loading said contents of said master control item table from said server into said game playing terminal, thus preventing said player from rewriting said control item table for display at said game playing terminal.

* * * * *